May 15, 1945.    R. MITCHELL    2,376,167
FASTENER
Filed Dec. 8, 1941

Inventor
Robert Mitchell,
Barthel & Bugbee
Attorneys

Patented May 15, 1945

2,376,167

UNITED STATES PATENT OFFICE 2,376,167

FASTENER

Robert Mitchell, Detroit, Mich., assignor to United-Carr Fastener Corporation, Cambridge, Mass., a corporation of Massachusetts Application December 8, 1941, Serial No. 422,029

8 Claims. (Cl. 85—36)

This invention relates to fasteners and in particular to screw anchors. One object of this invention is to provide a screw anchor which can be inserted from the top or front of the work the same as the screw, thereby facilitating assembly and speeding up production, and making assembly possible where the inside or back of the work is inaccessible.

Another object is to provide a screw anchor which has wings which engage the threads of the screw near its base in addition to a midportion which engages the threads near the tip of the screw, thereby giving a double grip upon the screw, with a consequent lessening of the chances of the screw becoming loosened under vibration.

Another object is to provide a screw anchor as set forth in the preceding objects, wherein the screw anchor is formed of resilient or spring material, such as steel.

Another object is to provide a screw anchor having a midportion engageable with the threads of the screw near its tip, and wings which approach one another to engage the threads near the head of the screw, the screw anchor being arranged to be drawn into firm engagement with the work in response to the turning of the screw.

Another object is to provide a screw anchor as set forth in the preceding objects which is capable of being inserted through a rectangular aperture in the work, this aperture preventing rotation of the screw anchor.

Another object is to provide a screw anchor as set forth in the preceding objects, wherein additional locking means, such as a spring nut, is provided adjacent the midportion of the screw anchor for additionally locking the screw threads, especially in installations where the work is subjected to severe vibration.

Another object is to provide a screw anchor for use with self-tapping screws and composed of a central portion and closely approaching wings which are adapted to acquire threads from the rotation of the screw and which in turn grip the threads and prevent rotation of the screw at both the tip and the base of the screw adjacent the head.

Another object is to provide a screw anchor as set forth in the preceding objects, wherein the wings are formed with partially tubular portions at the points where they are engaged by the screw threads so as to give a greater purchase between the threads and these tubular portions, these tubular portions being optionally extensible laterally to reduce the clearance or "float" between the screw anchor and the edges of the workpiece aperture.

Another object is to provide a screw anchor with a central portion and closely approaching wings engaging the screw threads at spaced locations, and an additional spring lock nut associated with the midportion and connected thereto by means which prevents rotation of the nut relatively to the screw anchor.

In general, the screw anchor of this invention consists of a strip of resilient metal, preferably strip steel, and generally U-shaped having a central aperture and wings bent away from this aperture and toward one another so as to provide two spaced portions for engagement by the threads of a screw, preferably a self-tapping screw. The free ends of the strip are bent away from one another in opposite directions so as to form portions which engage and space the two members which are joined together thereby. The screw anchor between the central aperture and the thread-gripping portions of the wings is of loop-shaped form with convergent portions which are drawn back into substantially the same plane against the back of the rear member or wall of the work piece when the screw is tightened. The screw anchor at its midportion optionally carries an additional spring lock nut connected to the screw anchor to prevent rotation and loss, and additionally gripping the threads of the screw, particularly for installations where there is excessive vibration.

Figure 8:
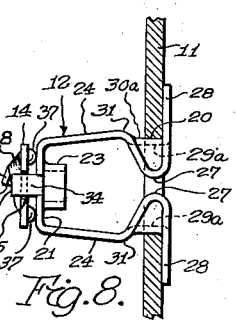
Fig. 8 is a side elevation similar to Fig. 5, but showing a modification wherein the tubular thread-gripping portion in the wings is extended to reduce the floating effect of the screw anchor.
Figure 9:
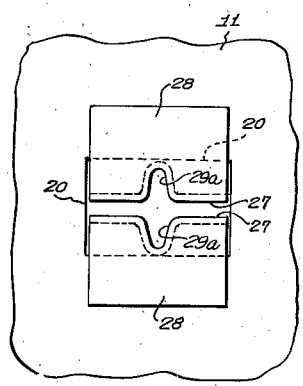
Fig. 9 is a front elevation of the structure shown in Fig. 8.
Figure 12:
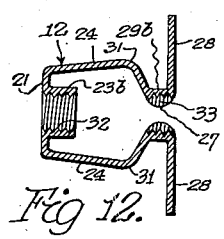
Fig. 12 is a central longitudinal section through a screw anchor with pre-threaded tubular portions, especially adapted for use with machine screws rather than self-tapping screws.

The modified screw anchor of Figs. 8 and 9 is provided with laterally extended tubular portions on the wings so as to reduce the amount of "float" or lateral slidability in the aperture of the workpiece through which the screw anchor is inserted. This "float" can thus be regulated to provide a sufficient self-finding or self-adjusting action yet without too much looseness or lateral sliding. A further modification shown in Fig. 12 provides pre-threaded tubular portions for receiving a machine screw rather than the self-tapping screws preferably employed with the other forms of the invention. The screw anchor of Figs. 1 to 10 inclusive may also be employed without the lock nut, may be employed in uniting workpieces where the rear surface or interior of the workpiece is not accessible, such as in the case of the tubular workpiece shown in Fig. 10.

Figure 3:
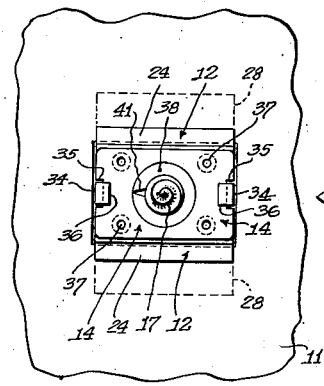
Fig. 3 is a rear elevation of the structure shown in Fig. 1.
Figure 2:
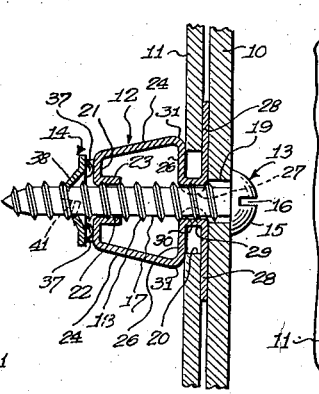
Fig. 2 is a central vertical section taken along the line 2—2 in Fig. 1 showing a lock nut applied thereto.
Figure 1:
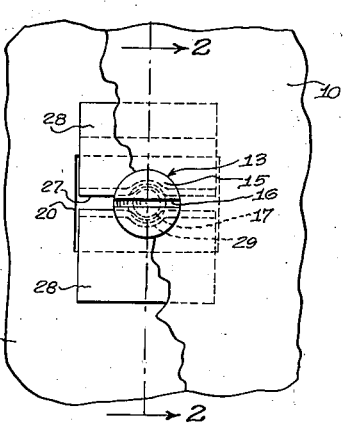
Fig. 1 is a front elevation of a work piece with a screw and a screw anchor inserted therein, according to the present invention.

Referring to the drawing in detail, Figs. 1 and 2 show a pair of workpiece members 10 and 11 united by a screw anchor, generally designated 12 including a screw, generally designated 13 and an optional spring lock nut generally designated 14. The screw 13 is preferably of the self-tapping type, with a head 15 having any suitable slot 16 and a shank 17 with self-tapping threads 18 adapted to cut their own corresponding threads in the portions of the screw anchor 12 which they engage. The workpiece member 10 contains an aperture 19 for the passage of the screw 13, and the workpiece member 11 contains an enlarged rectangular aperture 20 which is sufficiently large for receiving the screw anchor 12 when the latter is inserted from the front.

Figure 6:
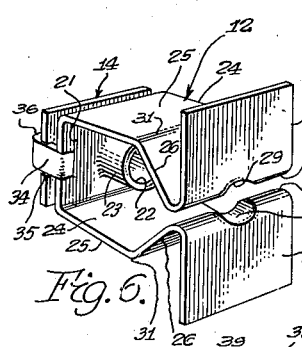
Fig. 6 is a perspective view of the screw anchor and lock nut assembly of Figs. 1 to 5 inclusive.
Figure 4:
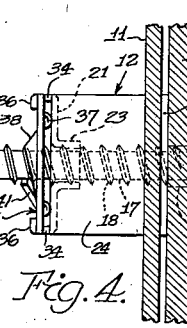
Fig. 4 is a top plan view of the screw anchor, screw and lock nut of Fig. 1, with the work in section.
Figure 5:
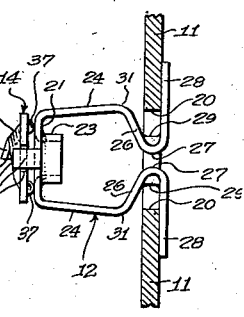
Fig. 5 is a side elevation of the screw anchor and lock nut immediately after their insertion through an aperture in the work piece.
Figure 7:
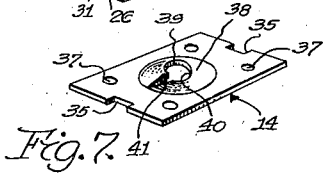
Fig. 7 is a perspective view of a spring lock nut as used in the assembly of Figs. 1 to 6 inclusive.

The screw anchor 12 consists of a central portion 21 having an aperture 22 formed therein with a forwardly extending tubular portion 23 adapted to be gripped by the threads 18 of the screw 13. (Figs. 2 and 6.) Extending forwardly in the same direction as the tubular portion 23 are wings 24 containing slightly divergent portions 25 continuing in inwardly bent convergent wing portions 26 closely approaching one another at adjacent but spaced inner ridges 27 beyond which the free ends 28 are bent away from one another in substantially the same plane. The inner ridges 27 contain partially tubular portions 29 formed therein for engagement with the threads 18 of the screw 13 adjacent the head 15. These tubular portions 29 have outer walls 30 which are spaced away from the adjacent edges of the aperture 20 in the workpiece 11 so as to provide a certain amount of clearance for slidability relatively to the workpiece. This clearance provides a self-finding or self-aligning action during assembly, namely a "float" between the screw anchor 12 and the workpiece member 11.

The side walls 30 of the tubular portions 29 may be extended laterally, as in the modification of Fig. 8 where the side walls 30a lie close to the edges of the rectangular aperture 20 in the workpiece member 11, the tubular portions 29a thereof, (Fig. 9), being extended laterally a greater amount than in Figs. 1 to 6 inclusive. By this means the clearance or "float" can be reduced to any desired amount, or substantially eliminated altogether, depending upon the particular installation. In any case, the portions 25 at the outer ridges 31 where they join the converging portions 26 are separated from one another by an amount which is less than the width of the aperture 20 when the wing portions 28 are squeezed toward one another to narrow the gap between the inner ridges 27 while the screw anchor 12 is being inserted through the aperture 20.

Ordinarily, the tubular portion 23 and the partially tubular portions 29 are unthreaded, threads being formed therein by the engagement of the threads 18 of the self-tapping screw 13 as the latter is rotated during assembly. In the modification of Fig. 12, however, the tubular portions 23b and 29b are pre-threaded as at 32 and 33 respectively, so as to receive the threads of a machine screw rather than a self-tapping screw.

Figure 10:
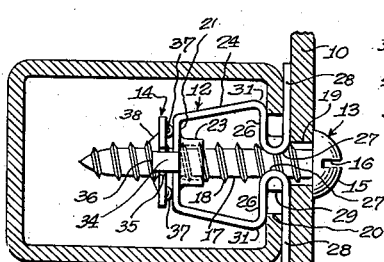
Fig. 10 is a side elevation of the screw anchor, lock nut and screw assembly applied to the uniting of work pieces, one of which is tubular or otherwise inaccessible from the rear.
Figure 11:
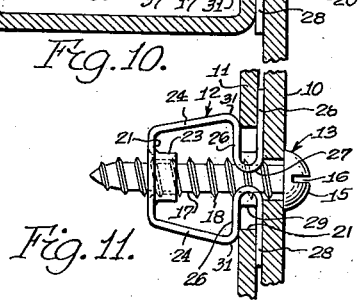
Fig. 11 is a side elevation of a screw and screw anchor similar to Fig. 2, but with the spring lock nut omitted.

The screw anchor 12 is complete in itself, as shown in Fig. 11, and may be used with the screw 13 without any additional elements. In occasional installations where vibration is excessive, or where the dislodgement of the screw might entail serious consequences, as in aircraft, the screw anchor 12 may be provided with the additional lock nut 14 (Figs. 1 to 10 inclusive). The lock nut 14 is secured to the screw anchor 12 by any suitable means, such as by tabs 34 preferably integral with the central portion 21 of the screw anchor 12 and extending through notches 35 in the opposite ends of the lock nut 14 and with the ends thereof bent over as at 36 to prevent loss of the lock nut 14.

The lock nut 14 is also preferably provided with projections 37 stamped therein and serving to space the lock nut 14 away from the central portion 21 of the screw anchor 12. The lock nut 14 is also provided with a central bulge or dished portion 38 (Fig. 7) formed preferably by dies and preferably integral with the remainder of the lock nut 14. The bulge 38 is provided with a central aperture 39 having a spirally ascending edge 40 with a slit 41 forming a line of demarcation or shoulder between the low and high points of the spiral edge 40.

In the operation of the invention, the screw anchor 12, with or without the lock nut 14, is pinched together and pushed through the aperture 20 from front to rear of the rearward workpiece member 11. As the screw anchor 12 is preferably of resilient material, such as steel, the wing portions 25 and 28 spring outward after being inserted through the aperture 20, with the outer ridges 31 moving outwardly beyond the edges of the aperture 20, thereby occupying the positions shown in Fig. 5. The forward workpiece member 10 is then brought into engagement with the wing portions 28 with its aperture 19 opposite the aperture 20. The screw 13 is then inserted through the apertures 19 and 20 and forced between the partially tubular portions 29, forming threads therein as the screw 13 is rotated by the screwdriver. As the tip of the screw passes through the aperture 22 in the tubular portion 23 and midportion 21 of the screw anchor 12, it likewise cuts threads therein.

Thus far the portions 26 of the screw anchor 12 are still convergent. As the screw 13 is rotated still farther, however, (Figs. 2, 10 and 11) the convergent portions 26 are forcibly drawn approximately into the same plane with the outer ridges 31 lying against the back surface of the rearward workpiece member 11. As the wing ends 28 are already located between the forward and rearward workpiece members 10 and 11, this action tightly clamps them together in slightly spaced relationship, depending upon the thickness of the wing ends 28.

While the screw 13 is being inserted, it may wobble around until it finds the gap between the tubular portions 29, the screw anchor 12 sliding around laterally while this is being done, due to the clearance or "float" between the outer walls 30 of the tubular portions 29 and the edges of the aperture 20. The device is thus well adapted for insertion in blind holes where the workman does not have a clear view of the rearward workpiece member 11.

If it is desired to reduce this clearance or "float," the modification of Fig. 8 is preferably used, in which case the extension of the side walls 30a of the tubular portions 29a partially or wholly fills up the clearance between them and the edges of the aperture 20. If machine screws are to be used instead of self-tapping screws, the modification of Fig. 12 with the pre-threaded portions 32 and 33 is preferably employed.

If the workpiece assembly is subject to excessive vibration, or if the consequences of dislodgment of the screw would be dangerous, as in aircraft, the screw anchor 12 may be additionally provided with the lock nut 14 (Figs. 1 to 10 inclusive). The operation of assembling the parts is the same as previously described, the assembly of the lock nut 14 and screw anchor 12 being pushed through the aperture 20 as before. The insertion of the screw through the lock nut aperture 39, however, causes the spiral edge 40 thereof to additionally grip the spiral threads 18 of the screw 13 at a location spaced apart from the portions 23 and 29 also engaged by the threads 18, thereby gripping the threads 18 at three different spaced locations along the shank 17 of the screw 13.

Since the screw anchor of this invention can be inserted from the front of the structure being assembled, it is particularly well adapted to the assembly of inaccessible pieces, such as the tubular member shown in Fig. 10. The modification of Fig. 9 provides additional gripping portions for the threads in the elongated grooves 29a, thus increasing the holding power. The portions 29 of the principal form of their invention (Fig. 6) are preferably formed by dies so that they give accurate lodgement for the threads and hence snugly engage the screw. Furthermore, more threads can be accommodated in the die-formed partially tubular portions 29 than if the inner ridges 27 alone were depended upon for receiving the threads. The variety of screw anchors required for varying conditions is also greatly reduced since a given size of screw anchor will fit several different sizes of screw. It is also not necessary to manufacture to the close dimensions and tolerances required by other screw anchors. The screws may be removed and replaced as often as is necessary. Assembly is accomplished with ease and rapidity, due to the floating action of the screw anchor, especially where the apertures in the two workpiece members are not accurately in alignment or where one is blind and inaccessible.

While a specific embodiment of the invention has been described and illustrated, it will be understood that various modifications may be made within the scope of the appended claims without departing from the spirit of the invention.

What I claim is:

1. In a screw anchor for receiving a screw, a strip of resilient material having a central connecting portion with a screw aperture and bent wing portions approaching each other in spaced ridges at a location spaced longitudinally away from said screw aperture, said bent wing portions having support-engaging portions for attaching the anchor to a support said screw aperture and said ridges being engageable by the threads of a screw, and a locking member disposed adjacent and supported by said central wing portion in alignment with said screw aperture.

2. In a screw anchor for receiving a screw, a strip of resilient material having a central connecting portion with a screw aperture and bent upstanding wing portions approaching each other in spaced ridges at a location spaced longitudinally away from said screw aperture, said screw aperture and said ridges being engageable by the threads of a screw, said screw aperture having pre-formed threads therein.

3. In a screw anchor for receiving a screw, a strip of resilient material having a central connecting portion with a screw aperture and bent upstanding wing portions approaching each other in spaced ridges at a location spaced longitudinally away from said screw aperture, and having semi-circular tubular portions therein, said screw aperture and said semi-circular tubular portions of said ridges being engageable by the threads of a screw, said screw aperture and said semi-circular tubular portions having pre-formed threads therein.

4. In a screw anchor adapted to receive a screw, a strip of resilient material having a central connecting portion with a screw aperture and bent upstanding wing portions approaching each other in spaced ridges at a location spaced longitudinally away from said screw aperture, and having semi-circular tubular portions therein, said screw aperture and said semi-circular tubular portions of said ridges being engageable by the threads of the screw, said semi-circular tubular portions being extended transversely to provide laterally elongated grooves whereby to reduce the clearance between said tubular portions and the edges of the aperture through which the screw anchor is inserted.

5. A screw anchor of the class described comprising a strip of metal generally U-shaped in formation providing a pair of opposed wing portions connected at one end by a central portion having a screw-receiving aperture, outwardly extended portions at the opposite end of the wings to prevent passage of the anchor through an aperture in a work piece while the central portion is of a size to pass through said aperture, opposed inner ridges in said wings adjacent to said outwardly extended portions for threaded engagement with a screw at a longitudinally spaced distance from the said screw-receiving aperture and outer ridges on said wings adjacent to said inner ridges, said outer ridges being spaced a sufficient distance apart to require contraction of said wings when passed through the aperture in said work piece whereby said anchor may be snapped into place.

6. A screw anchor of the class described comprising a strip of metal generally U-shaped in formation providing a pair of opposed wing portions connected at one end by a central portion having a screw-receiving aperture, outwardly extended portions at the opposite end of the wings to prevent passage of the anchor through an aperture in a work piece while the central portion is of a size to pass through said aperture, opposed inner ridges in said wings adjacent to said outwardly extended portions for threaded engagement with a screw at a longitudinally spaced distance from the said screw-receiving aperture and outer ridges on said wings adjacent to said inner ridges, said outer ridges being spaced a sufficient distance apart to require contraction of said wings when passed through the aperture in said work piece whereby said anchor may be snapped into place, and said inner ridges having partially tubular portions therein providing the means for engaging the threads of the screw.

7. A screw anchor of the class described comprising a strip of metal generally U-shaped in formation providing a pair of opposed wing portions connected at one end by a central portion having a screw-receiving aperture, outwardly extended portions at the opposite end of the wings to prevent passage of the anchor through an aperture in a work piece while the central portion is of a size to pass through said aperture, opposed inner ridges in said wings adjacent to said outwardly extended portions for threaded engagement with a screw at a longitudinally spaced distance from the said screw-receiving aperture and outer ridges on said wings adjacent to said inner ridges, said outer ridges being spaced a sufficient distance apart to require contraction of said wings when passed through the aperture in said work piece whereby said anchor may be snapped into place and a locking member disposed adjacent to said central portion and supported thereby and having means for additional threaded engagement with the screw.

8. A screw anchor of the class described comprising a strip of metal generally U-shaped in formation providing a pair of opposed wing portions connected at one end by a central portion having a screw-receiving aperture, outwardly extended portions at the opposite end of the wings to prevent passage of the anchor through an aperture in a work piece while the central portion is of a size to pass through said aperture, opposed inner ridges in said wings adjacent to said outwardly extended portions for threaded engagement with a screw at a longitudinally spaced distance from the said screw-receiving aperture and outer ridges on said wings adjacent to said inner ridges, said outer ridges being spaced a sufficient distance apart to require contraction of said wings when passed through the aperture in said work piece whereby said anchor may be snapped into place, a separate threaded locking member for engagement with said screw and attaching means securing said locking member to the central portion in alignment with the aperture therein.

ROBERT MITCHELL.